US012726461B2

(12) United States Patent
Bae et al.

(10) Patent No.: US 12,726,461 B2
(45) Date of Patent: Sep. 1, 2026

(54) EFFICIENT PACKET TRANSMISSION METHOD USING EBPF (XDP) AND COMPUTING DEVICE FOR THE SAME

(71) Applicant: MONITORAPP CO., LTD., Seoul (KR)

(72) Inventors: Ki Cheol Bae, Anyang-si (KR); Ho Seong Son, Seoul (KR)

(73) Assignee: MONITORAPP CO., LTD., Seoul (KR)

( * ) Notice: Subject to any disclaimer, the term of this patent is extended or adjusted under 35 U.S.C. 154(b) by 43 days.

(21) Appl. No.: 18/950,688

(22) Filed: Nov. 18, 2024

(65) Prior Publication Data

US 2025/0211572 A1 Jun. 26, 2025

(30) Foreign Application Priority Data

Dec. 21, 2023 (KR) ........................ 10-2023-0188335

(51) Int. Cl.
*H04L 9/40* (2022.01)

(52) U.S. Cl.
CPC ...... *H04L 63/0236* (2013.01); *H04L 63/0263* (2013.01)

(58) Field of Classification Search
CPC ........................ H04L 63/0236; H04L 63/0263
See application file for complete search history.

(56) References Cited

U.S. PATENT DOCUMENTS

2022/0247696 A1* 8/2022 He .......................... H04L 47/34
2022/0272071 A1* 8/2022 Webb .................. H04L 63/0254
2023/0066013 A1* 3/2023 Ball ...................... G06F 21/606

FOREIGN PATENT DOCUMENTS

| CN | 115987990 A | 4/2023 |
|---|---|---|
| JP | 2017-521954 A | 8/2017 |
| JP | 2019-186658 A | 10/2019 |
| KR | 10-2021-0087399 A | 7/2021 |

OTHER PUBLICATIONS

Kimitoshi Takahashi et al., "A Portable Load Balancer with ECMP Redundancy for Container Clusters", IEICE Trans. Inf. & SYST., vol. E102-D, No. May 5, 2019, pp. 974-987.

* cited by examiner

*Primary Examiner* — J. Brant Murphy
(74) *Attorney, Agent, or Firm* — Rabin & Berdo, P.C.

(57) ABSTRACT

A computing device, comprising: a plurality of Docker services, each Docker service comprising a plurality of service containers that provide an identical service service; a plurality of ingress containers, each ingress container being assigned a different service IP address, wherein the service IP address is predefined for each service type provided by the plurality of Docker services; and an XDP program loaded and executed on a network driver, wherein the XDP program checks the destination IP address of a packet that has arrived at the network driver and forwards the packet to the ingress container assigned with the service IP address corresponding to the destination IP address, and the ingress container that receives the packet forwards the packet to the service container determined based on a predefined load balancing rule through an overlay network.

7 Claims, 4 Drawing Sheets

EFFICIENT PACKET TRANSMISSION METHOD USING EBPF (XDP) AND COMPUTING DEVICE FOR THE SAME

CROSS-REFERENCE TO RELATED APPLICATION

This application claims priority to Korean Patent Application No. 10-2023-0188335, filed in the Korean Intellectual Property Office on Dec. 21, 2023, the entire contents of which are hereby incorporated by reference.

BACKGROUND

Field

The present disclosure relates to an efficient packet transmission method using eBPF (XDP) in a containerized virtualized environment and a computing device for the same.

Description of Related Art

Cloud-based security services (SECaaS) are a model that provides various security functions desired by customers on a subscription-based pricing scheme.

Security services such as Web Application Firewalls (WAF) or Secure Internet Access can be offered in the form of Virtual Machines (VMs) or containers as part of SECaaS (Security as a Service).

When providing services in the form of containers, the commonly used packet delivery methods are as follows.

FIGS. 1 and 2 are diagrams that exemplify conventional packet delivery methods used when providing services in the form of containers.

As illustrated in FIG. 1, if a packet entering the host matches the DNAT rule, it is sent to the corresponding security service container. Alternatively, as illustrated in FIG. 2, before the packet is sent to the security service container, an ingress network is deployed, and the IP Virtual Server (IPVS) delivers the packet to the appropriate security service container.

However, such services have several issues.

In the method illustrated in FIG. 1, the packet must pass through the host's network stack, and each container entry involves processing by the container network stack. Additionally, if there is no ingress network, appropriate rules will be added using the host's iptables, and as the number of rules to be checked for each packet increases, the process becomes slower. On the other hand, in the method illustrated in FIG. 2, if there is an ingress network, the path to the security service container becomes more complex.

SUMMARY

In order to solve one or more problems (e.g., the problems described above and/or other problems not explicitly described herein), the present disclosure provides an efficient packet transmission method using eBPF (XDP) in a containerized virtualized environment and a computing device for the same.

According to some aspects of the disclosure, a computing device computing device comprises a plurality of Docker services, a plurality of ingress containers, and an XDP program loaded and executed on a network driver. Each Docker service comprises a plurality of service containers that provide an identical service. Each ingress container is assigned a different service IP address. The service IP addresses are predefined for each type of service provided by the plurality of Docker services. The XDP program checks the destination IP address of a packet that has arrived at the network driver and forwards the packet to the ingress container assigned with the service IP address corresponding to the destination IP address. The ingress container that receives the packet forwards the packet to the service container determined based on a predefined load balancing rule through an overlay network.

The plurality of ingress containers may include a first ingress container and a second ingress container.

The first ingress container and the second ingress container can communicate with the corresponding service containers through independently configured overlay networks.

If there are multiple Docker services corresponding to the ingress container, the ingress container can forward the packet to the Docker service corresponding to the domain name included in the packet.

The computing device may further include a container management daemon and an XDP management daemon, both of which are executed in the host default namespace of the computing device.

The XDP management daemon sets packet forwarding rules mapping service IP addresses to the corresponding ingress containers and loads them into the network driver of the computing device.

The container management daemon generates and manages the plurality of service containers in the form of Docker services.

According to other aspects of the disclosure, a method for checking, by an XDP program executed on a network driver, the destination IP address of a packet when the packet arrives at the network driver; if the destination IP address is a service IP address, redirecting the packet to the ingress container corresponding to the service IP address; and, after the ingress container that receives the packet performs a predefined validity check on the packet, forwarding the packet to the service container determined based on a load balancing rule through an overlay network.

A computer-readable recording medium storing a computer program according to the present invention for solving the aforementioned technical problem, wherein the program, when executed by at least one processor, executes the method.

A computing device according to the present invention for solving the aforementioned technical problem includes a processor and a memory storing instructions or programs executable by the processor, wherein, when the instructions or programs are executed by the processor, the method is executed.

According to some aspects of the disclosure, there is an advantage in that the XDP program executed on the network driver delivers the service packet directly to the service container through the ingress container without passing through the host kernel network stack, resulting in faster and more resource-efficient operation. Since the XDP program redirects packets based on their IP addresses, even if the service IP is exploited in a hacking attempt, the host remains unaffected. The ingress container performs a packet validity check and then applies load balancing (LB), preventing unnecessary resource usage in the service container. The overlay network configuration ensures intuitive communication between the ingress container and the service container, with enhanced security. The container is created in the form of a Docker service, facilitating easy expansion of the security service container.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawing, in which.

DETAILED DESCRIPTION

Figure 1:
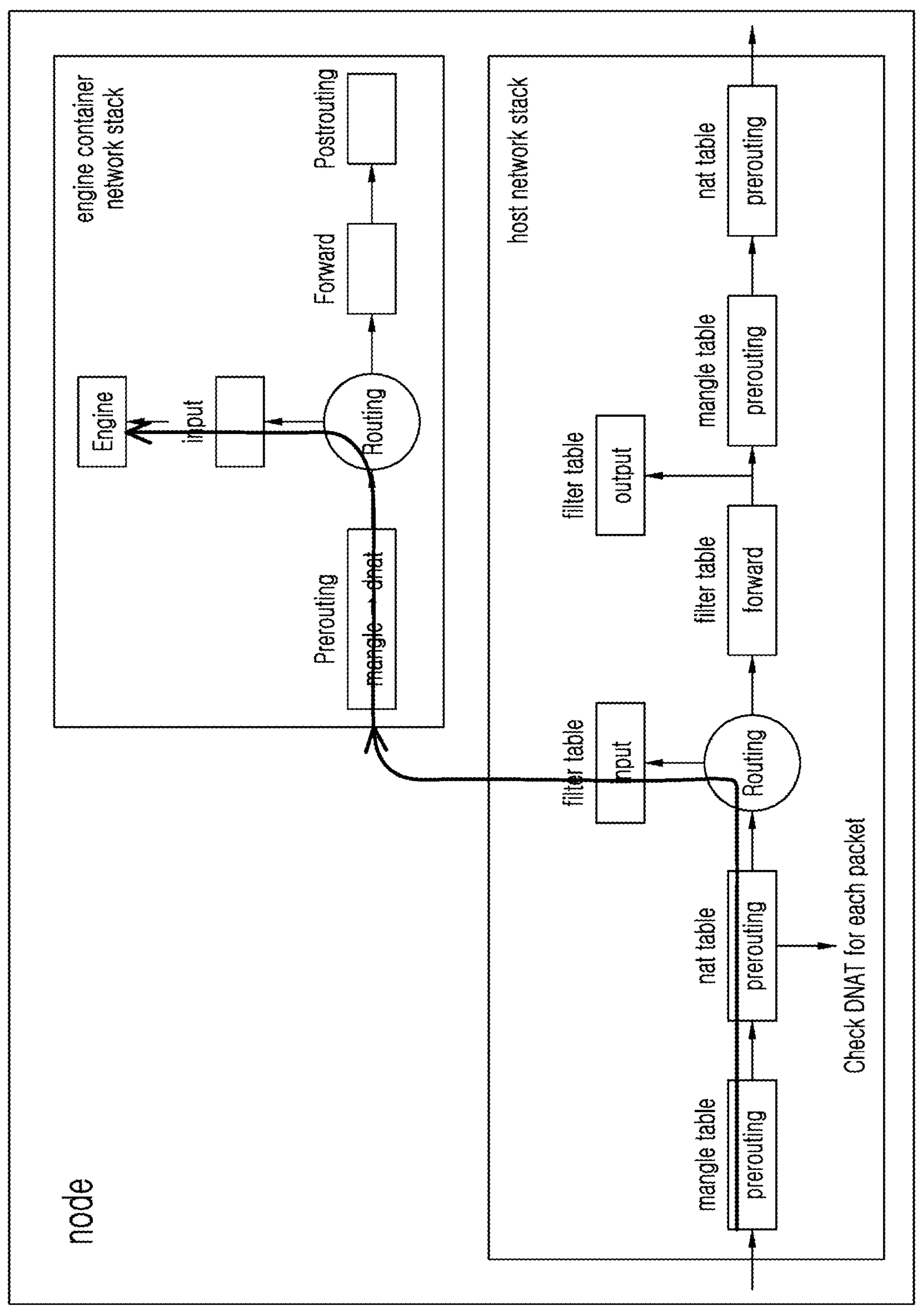
FIGS. 1 and 2 are diagrams that exemplify the conventional packet delivery methods used when providing services in the form of containers.
Figure 2:
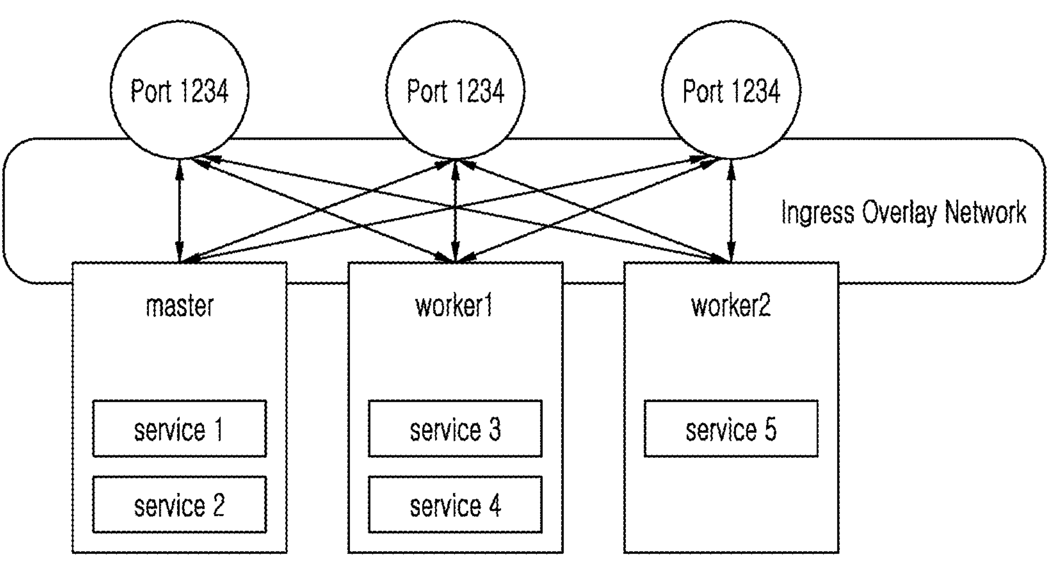

Hereinafter, certain embodiments will be described in detail with reference to the accompanying drawings to help those with ordinary knowledge in the art easily achieve the present disclosure.

The terms are used herein for the purpose of describing the embodiments and not intended to limit the present disclosure. In the description, a singular expression also includes a plural expression unless specifically stated otherwise in the context. The terms "comprises" and/or "comprising" as used herein do not foreclose the presence or addition of one or more components other than the specified component. Throughout the description, the same reference numerals refer to the same components, and "and/or" includes each and combinations of one or more of the specified components. The terms "first", "second", etc. are used to describe various components, but it goes without saying that these components are not limited by these terms. These terms are only used to distinguish one component from another. Therefore, it goes without saying that a first component mentioned below may be a second component within the technical idea of the present disclosure.

A "computing device" as used herein includes all various devices capable of performing computations and providing results to a user. For example, a computing devices may include desktop PCs, notebook computers, and server computers, as well as smart phones, tablet PCs, cellular phones, PCS phones (Personal Communication Service phones), synchronous and asynchronous IMT-2000 (International Mobile Telecommunication-2000) mobile terminals, palm personal computers (Palm PCs), and personal digital assistants (PDAs).

Figure 3:
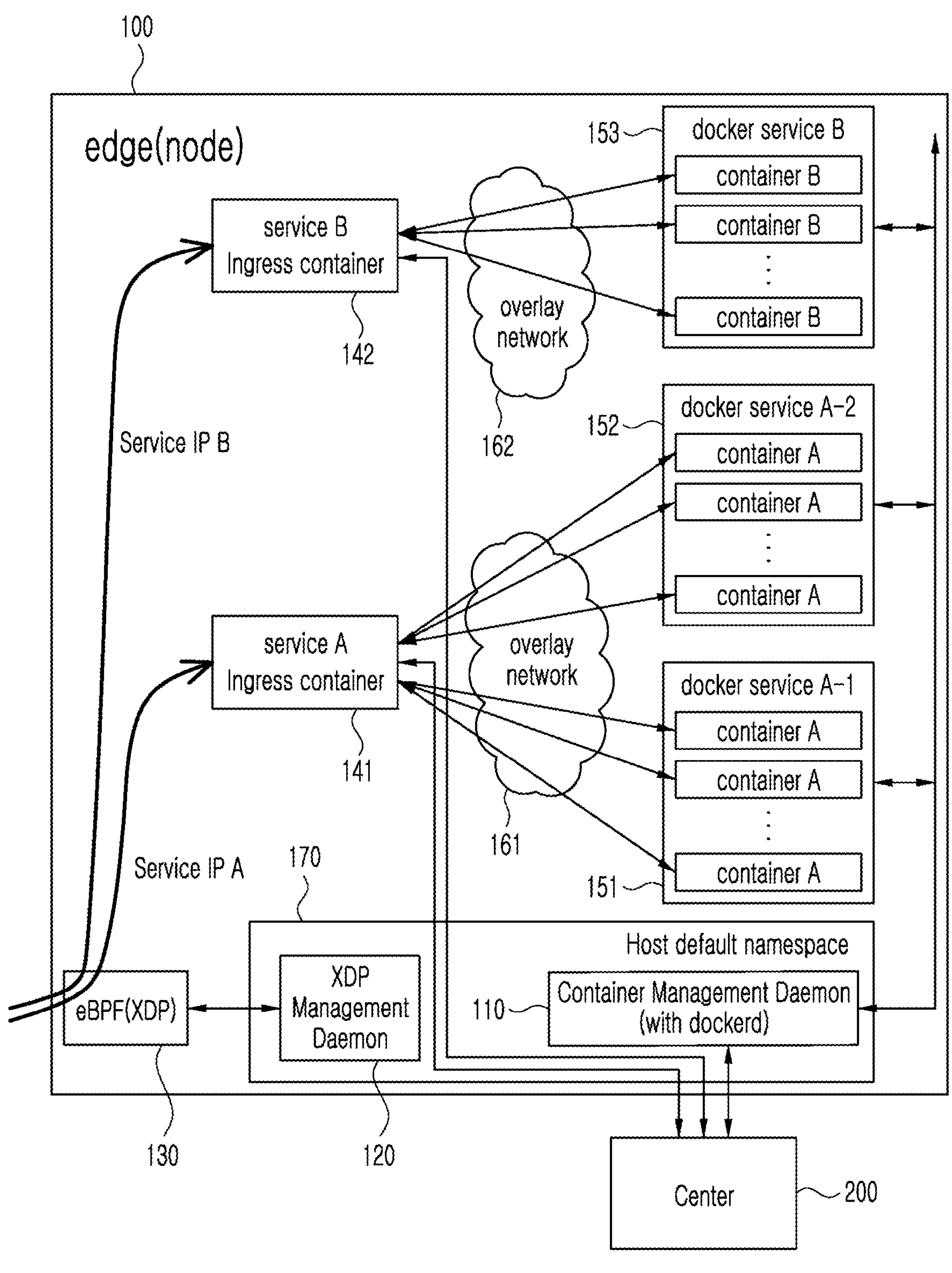
FIG. 3 is a diagram illustrating the configuration of a computing device according to one embodiment of the present invention.

FIG. 3 is a diagram illustrating the configuration of a computing device according to one embodiment of the present invention. Referring to FIG. 3, the computing device 100 according to one embodiment of the present invention is an edge (node) computing device constituting a cloud system. The computing device 100 may include a container management daemon 110, an XDP management daemon 120, an XDP program 130, a plurality of ingress containers 141 and 142, and a plurality of Docker services 151, 152, and 153.

The container management daemon 110 and the XDP management daemon 120 may be executed in the host default namespace 170 of the computing device 100.

The XDP management daemon 120 loads and manages the XDP (eXpress Data Path) program 130 in the network driver of the computing device 100.

The XDP program 130 may be implemented as a program type executable on a Linux network driver using eBPF (extended Berkeley Packet Filter) technology, and in this embodiment, native mode may be used. Native mode allows the XDP program to execute in the network driver of the computing device 100 and process packets before sk_buff allocation, enabling packet processing prior to the Linux kernel stack.

The XDP management daemon 120 can load the XDP program 130 into the network driver by setting packet forwarding rules. The packet forwarding rules may be implemented in the form of a MAP, where each service IP address can be mapped to its corresponding ingress container 141, 142, and the management IP address can be mapped to the host.

The plurality of ingress containers 141 and 142 are each assigned different service IP addresses. In FIG. 3, ingress container 141 is assigned "Service IP A," and ingress container 142 is assigned "Service IP B".

The service IP address may be predefined according to the type of service provided by the container (container A, container B). For example, if the type of service provided by container A is service A, and the type of service provided by container B is service B, the service IP addresses for service A and service B can be predefined as 'service IP A' and 'service IP B,' respectively, and 'service IP A' and 'service IP B' can be preassigned to the ingress containers 141 and 142 corresponding to each type of service.

The XDP program 130 checks the destination IP address of the packet arriving at the network driver, and if the destination IP address is a service IP address, it can redirect the packet to the ingress container 141 or 142 assigned with the corresponding service IP address. The XDP program 130 can pass the packet to the host if the destination IP address is a management IP address.

The container management daemon 110 manages the Docker services 151, 152, and 153. The container management daemon 110 performs the function of creating and managing containers in the form of Docker services on the computing device 100.

A Docker service is a set of containers generated from the same image, and containers belonging to the same Docker service provide the same service. To distinguish from ingress containers, the containers belonging to a Docker service will be referred to as service containers.

As illustrated in FIG. 3, multiple Docker services 151 and 152 that provide the same service may be created. For example, if the same service is provided to different customers, a Docker service may be created for each customer.

The container management daemon 110 can create or delete Docker services in conjunction with the Docker daemon (dockred) and can manage the number of service containers in a Docker service and monitor the status of the service containers.

Specifically, the container management daemon 110, upon receiving data necessary for the creation and communication of service containers (e.g., customer information, edge (node) information, etc.) from the center 200, can combine the customer information and edge information to create a Docker service ID and generate a Docker service. In the case where the service container provides a security service that detects attack traffic, the container management daemon 110, once the service container is created, can load the policy set by the customer receiving the security service into memory, thereby preparing the service.

If the service container (container A, container B) is a security service container, the service container (container A, container B) can act as a proxy by performing packet inspection and logging according to a predefined policy.

The customer information mentioned earlier may include the customer ID, customer domain name, etc., and the customer information may also include information identifying the types of services the customer is using (e.g., information identifying security service A, security service B).

The edge information may include details such as the country where the edge 100 is located, region information, and edge number.

The customer information and edge information provided here are merely examples, and as long as the information can uniquely generate the Docker service ID for the Docker service created on the computing device 100 based on the customer and service type, it is sufficient.

The ingress containers 141 and 142, like the container management daemon 110, can receive data necessary for container creation and communication from the center 200. They can then query the Docker daemon (dockred) with the Docker service ID created by combining the customer information and edge information and receive the IP list of the containers created corresponding to the Docker service ID, caching the list in memory.

The ingress containers 141 and 142 can initiate a health check on the containers in the Docker service corresponding to their IP list and can stop the health check if the Docker service is deleted.

When the service packet arrives with a service IP address as its destination from the XDP program 130, the ingress containers 141 and 142 can perform a minimal predefined validity check before delivering the packet to the corresponding Docker service through the overlay network. For example, ingress containers 141 and 142 can perform validity checks on the Host name in the HTTP header or the SNI field in the Client Hello packet used in HTTPS.

For example, if multiple Docker services 151 and 152 correspond to ingress container 141, the ingress container 141 can check the domain name included in the service packet and forward the packet to the Docker service corresponding to the Docker service ID associated with that domain name. If the service packet is an HTTP packet, the ingress container can check the domain name in the HTTP header and forward the packet to the Docker service corresponding to the Docker service ID that matches that domain name. To facilitate this, a MAP that maps domain names to Docker service IDs can be prepared in memory in advance.

Furthermore, the ingress containers 141 and 142 can forward the packet to the service container determined based on a predefined load balancing rule. In this case, ingress containers 141 and 142 will exclude from the packet forwarding process any service container that has been identified as abnormal during the health check.

The plurality of ingress containers 141 and 142 can communicate with the Docker services 151, 152, and 153 that provide services corresponding to the service IP addresses assigned to each ingress container through the overlay network. Specifically, an overlay network for communication between ingress container 141 and the containers (container A) of Docker services 151 and 152, and an overlay network for communication between ingress container 142 and the containers (container B) of Docker service 153, can be independently configured.

The center 200 manages the services provided by the cloud system, and although one center 200 is illustrated in FIG. 3, a center 200 may be provided for each type of service provided by the cloud system.

For example, if the cloud system provides security services A and B, a center 200 managing security service A and a center 200 managing security service B can be separately provided. However, depending on the embodiment, it is also possible to implement a single center 200 that manages multiple services.

The center 200 can provide the container management daemon 110 and the ingress containers 141 and 142 of the computing device 100 with the data necessary for creating and communicating with the service containers. For example, when generating a service container for security service A, the center 200 can provide the container management daemon 110 and the ingress container 141, which corresponds to security service A, with the data necessary for creating and communicating with the service container. Similarly, when generating a service container for security service B, the center 200 can provide the container management daemon 110 and the ingress container 142, which corresponds to security service B, with the data necessary for creating and communicating with the service container.

Figure 4:
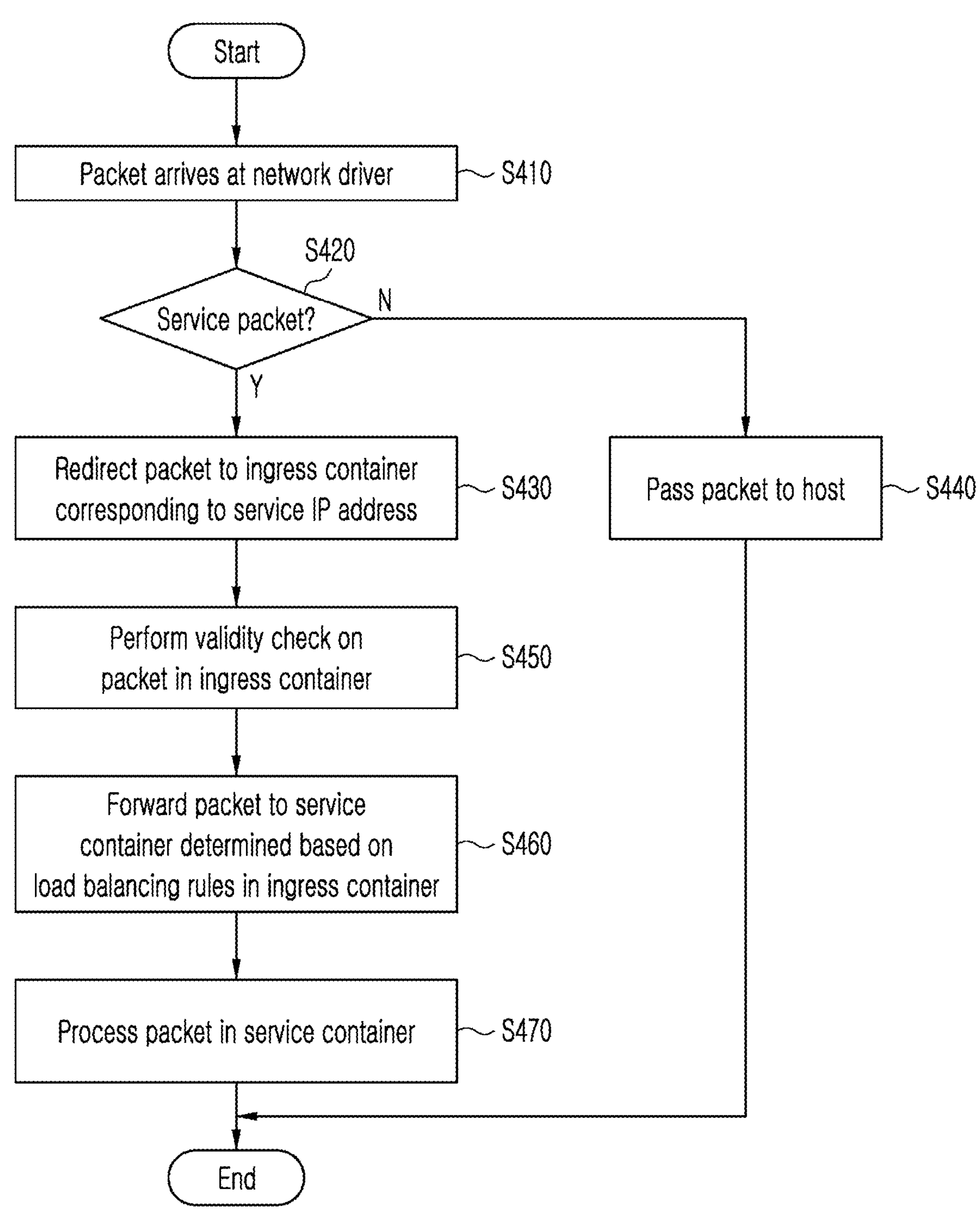
FIG. 4 is a flowchart illustrating the packet processing sequence in the computing device according to one embodiment of the present invention.

FIG. 4 is a flowchart illustrating the packet processing sequence in the computing device according to one embodiment of the present invention. Referring to FIG. 4, when a packet arrives at the network driver (S410), the XDP program 130 checks the destination IP address of the packet, and if the destination IP address is a service IP address (S420-Y), it can redirect the packet to the ingress container 141 or 142 assigned with the corresponding service IP address (S430). On the other hand, if the destination IP address is a management IP address (S420-N), the XDP program 130 can pass the packet to the host (S440).

After step S430, the ingress containers 141 and 142, having received the service packet from the XDP program 130, can perform a validity check on the packet (S450) and forward it through the overlay network to the service container (container A, container B) determined based on a load balancing rule (S460). In step S460, if multiple Docker services correspond to ingress containers 141 and 142, the ingress containers can check the domain name included in the packet and forward the packet to the container (container A, container B) of the Docker service corresponding to the domain name.

Finally, the service container (container A, container B) can process the packet received from the ingress container 141 or 142 (S470). For example, in the case of a security service container, it can perform packet inspection and logging according to a predefined policy while acting as a proxy.

The embodiments described above may be implemented as a hardware component, a software component, and/or a combination of a hardware component and a software component. For example, the devices, methods, and components described in the embodiments may be implemented by using one or more general computing device or specific-purpose computing device such as a processor, a controller, an arithmetic logic unit (ALU), a digital signal processor, a microcomputer, a field programmable gate array (FPGA), a programmable logic unit (PLU), a microprocessor, or any other device capable of executing instructions and responding thereto. The processing device may execute an operating system (OS) and one or more software applications executed on the operating system. Further, the processing device may access, store, operate, process, and generate data in response to the execution of software. For convenience of understanding, it is described in certain examples that one processing device is used, but one of ordinary skill in the art may understand that the processing device may include a plurality of processing elements and/or a plurality of types of processing elements. For example, the processing device may include a plurality of processors or one processor and one controller. In addition, other processing configurations such as a parallel processor are possible.

The software may include a computer program, code, instructions, or a combination of one or more of the above, and may configure the processing unit, or instruct the processing unit independently or collectively to operate as desired. Software and/or data may be interpreted by the processing device or, in order to provide instructions or data to the processing device, may be embodied in any type of machine, component, physical device, virtual equipment, computer storage medium or device, or signal wave transmission, permanently or temporarily. The software may be distributed over networked computer systems and stored or executed in a distributed manner. The software and data may be stored on one or more computer-readable recording media.

The method according to the embodiment may be implemented in the form of program instructions that can be executed through various computer means and recorded in a computer-readable medium. The computer readable medium may include program instructions, data files, data structures, and the like alone or in combination. The program instructions recorded on the medium may be those specially designed and configured for the purposes of the embodiments, or may be known and available to those skilled in computer software. Examples of computer readable recording medium include magnetic media such as hard disks, floppy disks, and magnetic tape, optical media such as CD-ROMs and DVDs, magneto-optical media such as floptical disks, and hardware devices specifically configured to store and execute program instructions such as ROM, RAM, flash memory, and the like. Examples of the program instructions include machine language codes such as those generated by a compiler, as well as high-level language codes that may be executed by a computer using an interpreter, and so on. The hardware device described above may be configured to operate as one or more software modules in order to perform the operations according to the embodiments, and vice versa.

As described above, although the embodiments have been described with reference to the limited drawings, a person of ordinary skill in the art can apply various technical modifications and variations based on the above. For example, even when the described techniques are performed in the order different from the method described above, and/or even when the components of the system, structure, device, circuit, and the like are coupled or combined in a form different from the way described above, or replaced or substituted by other components or equivalents, an appropriate result can be achieved.

The invention claimed is:

1. A computing device, comprising a processor and a memory storing instructions, the instructions in response to execution by the processor implementing:

a plurality of Docker services, wherein the plurality of Docker services include a plurality of service containers that provide an identical service;

a plurality of ingress containers wherein the plurality of ingress containers are assigned different service IP addresses, and the service IP addresses are predefined for each service type provided by the plurality of Docker services; and an XDP program loaded and executed on a network driver, wherein the XDP program checks a destination IP address of a packet that has arrived at the network driver, and forwards the packet to an ingress container assigned with a service IP address corresponding to the destination IP address, among the plurality of ingress containers, and wherein the ingress container forwards the packet through an overlay network to a service container determined based on a predefined load balancing rule.

2. The computing device according to claim 1, wherein the plurality of ingress containers includes a first ingress container and a second ingress container, and the first ingress container and the second ingress container communicate with corresponding service containers through independently configured overlay networks.

3. The computing device according to claim 1, wherein, based on multiple Docker services corresponding to the ingress container, the ingress container forwards the packet to a Docker service corresponding to a domain name included in the packet.

4. The computing device according to claim 1, further comprising a container management daemon and an XDP management daemon executed in a host default namespace of the computing device, wherein the XDP management daemon sets packet forwarding rules mapping service IP addresses to corresponding ingress containers and loads the packet forwarding rules into the network driver of the computing device, and the container management daemon generates and manages the plurality of service containers.

5. A packet transmission method applied to a computing device, comprising:

in response to a packet arriving at a network driver, checking, by an XDP program executed on the network driver, a destination IP address of the packet;

based on the destination IP address of the packet being a service IP address, redirecting the packet to an ingress container corresponding to the service IP address;

performing, by the ingress container, a predefined validity check on the packet, and forwarding the packet to a service container determined based on a load balancing rule through an overlay network.

6. The method according to claim 5, wherein, in the step of redirecting the packet, the ingress container forwards the packet to a Docker service corresponding to a domain name included in the packet based on multiple Docker services corresponding to the ingress container.

7. A non-transitory computer-readable recording medium storing a program for executing the method of claim 5 on a computer.

* * * * *